US011858104B2

(12) United States Patent
Britz et al.

(10) Patent No.: US 11,858,104 B2
(45) Date of Patent: Jan. 2, 2024

(54) PORTABLE POWER TOOL

(71) Applicant: Hilti Aktiengesellschaft, Schaan (LI)

(72) Inventors: Rory Britz, Buchloe (DE); Rainer Ontl, Landsberg (DE); Markus Hartmann, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 232 days.

(21) Appl. No.: 17/415,354

(22) PCT Filed: Dec. 4, 2019

(86) PCT No.: PCT/EP2019/083650
§ 371 (c)(1),
(2) Date: Jun. 17, 2021

(87) PCT Pub. No.: WO2020/126499
PCT Pub. Date: Jun. 25, 2020

(65) Prior Publication Data

US 2022/0063078 A1 Mar. 3, 2022

(30) Foreign Application Priority Data

Dec. 21, 2018 (EP) .................................... 18215055

(51) Int. Cl.
*B25D 11/00* (2006.01)
*B25D 17/06* (2006.01)

(52) U.S. Cl.
CPC ............ *B25D 17/06* (2013.01); *B25D 11/005* (2013.01); *B25D 2217/0015* (2013.01); *B25D 2217/0023* (2013.01); *B25D 2250/131* (2013.01)

(58) Field of Classification Search
CPC .................. B25D 11/005; B25D 17/06; B25D 2217/0015; B25D 2217/0023; B25D 2250/131; B25D 2250/191
See application file for complete search history.

(56) References Cited

U.S. PATENT DOCUMENTS 3,952,813 A * 4/1976 Chepurnoi .............. E21B 4/145 173/127
9,339,924 B2 * 5/2016 Friedrich ............... B25D 17/06
(Continued)

FOREIGN PATENT DOCUMENTS

DE 102005000042 A1 10/2006
DE 102012220886 A1 5/2014
(Continued)

OTHER PUBLICATIONS

International Search Report of PCT/EP2019/085123, dated Mar. 4, 2020.

*Primary Examiner* — Thomas M Wittenschlaeger
*Assistant Examiner* — David G Shutty
(74) *Attorney, Agent, or Firm* — Davidson, Davidson & Kappel, LLC

(57) ABSTRACT

The portable power chiseling tool has a tool holder, an electric motor, a striking mechanism and an idle strike catcher. The tool holder can receive a tool and retain it movably on a working axis. The striking mechanism includes an exciter piston, a striker, an anvil and a guide for the anvil. The exciter piston is coupled to the electric motor. The guide guides the anvil on the working axis. The idle strike catcher for the anvil has a conical inner surface facing the anvil. The anvil has an associated end face facing in the striking direction. The end face rests against the conical inner surface when the anvil is in its forwardmost position in the striking direction. The end face of the anvil has a first segment and a second segment in the circumferential direction. The second segment is offset in the striking direction relative to the first segment.

11 Claims, 2 Drawing Sheets

(56) References Cited

U.S. PATENT DOCUMENTS

| | | | | |
|---|---|---|---|---|
| 9,969,073 | B2 * | 5/2018 | Ontl | B25D 11/005 |
| 2006/0237206 | A1 * | 10/2006 | Schamberger | B25D 17/06<br>173/128 |
| 2011/0303429 | A1 * | 12/2011 | Kohlschmied | B25D 11/005<br>173/112 |
| 2017/0114983 | A1 | 1/2017 | Hauptmann et al. | |

FOREIGN PATENT DOCUMENTS

| | | | |
|---|---|---|---|
| EP | 2918376 | A1 | 9/2015 |
| EP | 3116688 | B1 | 1/2018 |

* cited by examiner

PORTABLE POWER TOOL

FIELD OF THE INVENTION

The present invention relates to a portable power chiseling tool, for example a hammer drill or an electric chisel.

BACKGROUND

A hammer drill is known, for example, from U.S. Pat. No. 9,339,924 B2. The hammer drill has an electro-pneumatic striking mechanism. A user switches on an electric motor of the hammer drill by actuating a pushbutton. However, the striking mechanism should only be activated when the user is pressing the hammer drill, more precisely a tool, against an underlying surface. The electric motor moves an exciter piston of the striking mechanism continuously. A striker of the striking mechanism is coupled to the movement of the exciter piston via a pneumatic chamber when ventilation openings of the pneumatic chamber are closed. The ventilation openings are controlled by an anvil. The anvil is arranged on the working axis between the striker and the tool. When the striking mechanism is pressed on, the anvil is moved into a working position in the direction of the striker. In the working position, the ventilation openings are closed and the striking mechanism is active. In the absence of contact pressure, a strike of the striker, referred to as an idle strike, ensures that the anvil leaves the working position. The ventilation openings are exposed and the striking mechanism switches off.

Owing to the idle strike, the anvil moves in the striking direction. A catcher catches the anvil. The anvil is preferably brought to a halt by the catcher. However, the anvil can rebound from the catcher, slide back into the working position and, closing the ventilation openings in an unwanted way, activate the striking mechanism. Typically, the very next strike is once again an idle strike. The idle strikes represent a considerable load on the portable power tool and the user since the entire impact energy is absorbed within the portable power tool and is not introduced into the underlying surface, as desired.

U.S. Pat. No. 9,339,924 B2 describes an anvil having an end face which is eccentric with respect to the catcher. The eccentric end face is intended to bring about rotation of the anvil, thereby withdrawing kinetic energy from the anvil. After this, the anvil no longer reaches the working position. The solution described is dependent on tolerance-free guidance of the anvil in order to ensure the eccentric arrangement. However, the anvil and the guidance thereof are subject to high wear due to the introduction of dust and drillings via the tool, causing a reduction in the accuracy of guidance. Moreover, the eccentric arrangement influences the efficiency of the transmission of the shockwave from the anvil to the axially arranged tool.

SUMMARY OF THE INVENTION

The portable power chiseling tool according to the invention has a tool holder, an electric motor, a striking mechanism and an idle strike catcher. The tool holder can receive a tool and retain it movably on a working axis. The striking mechanism includes an exciter piston, a striker, an anvil and a guide for the anvil. The exciter piston is coupled to the electric motor. The striker is coupled to the movement of the exciter piston via a pneumatic chamber. The anvil is arranged ahead of the striker in the striking direction. The guide guides the anvil on the working axis. The idle strike catcher for the anvil has a conical inner surface facing the anvil. The anvil has an associated end face which slopes relative to the working axis and faces in the striking direction. The end face rests against the conical inner surface when the anvil is in its forwardmost position in the striking direction. The end face of the anvil has a first segment and a second segment in the circumferential direction. The second segment is offset in the striking direction relative to the first segment. The offset in the two segments of the end face leads to the anvil tilting when it rests on the idle strike catcher. The tilting leads to jamming of the anvil in the guide tube. Simulations show additional bending of the anvil due to the axial offset between the opposite contact points on the anvil and the catcher. This increases the stopping effect of the catcher on the anvil.

BRIEF DESCRIPTION OF THE DRAWINGS

The following description explains the invention on the basis of exemplary embodiments and figures, in which.

Identical or functionally identical elements are indicated by the same reference numerals in the figures, unless stated otherwise.

DETAILED DESCRIPTION

Figure 1:
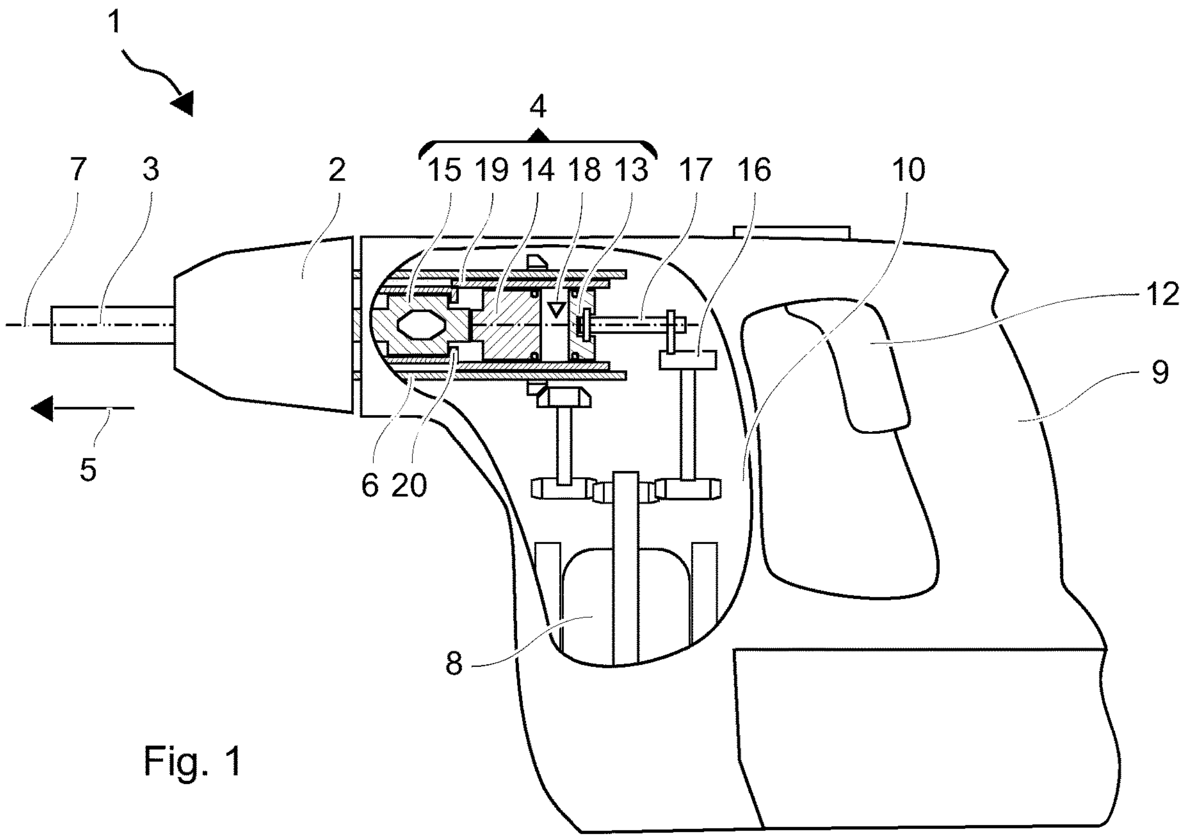
FIG. 1 shows a hammer drill

FIG. 1 schematically shows a hammer drill as an example of a portable power chiseling tool 1. The hammer drill has a tool holder 2 into which a tool 3 can be inserted and locked. The tools 3 can be, for example, drill bits for chiseling mineral construction materials, such as concrete or rock, by turning, or chisels for purely chiseling the same construction materials. The hammer drill 1 contains a pneumatic striking mechanism 4, which, during operation, periodically exerts blows in the striking direction 5 on the tool 3. In addition, the hammer drill 1 contains an output shaft 6, which, during operation, rotates the tool holder 2 and therefore the tool 3 about a working axis 7. The striking mechanism 4 and the output shaft 6 are driven by a motor 8, for example an electric motor. The output shaft 6 can be switched off in portable power chiseling tools 1 or in purely chiseling portable power tools 1 are without an output shaft.

The portable power tool 1 has a handle 9 with which the user can hold and guide the portable power tool 1 during operation. The handle 9 is fastened to a machine housing 10. The handle 9 is preferably arranged at an end of the portable power tool 1 or of the machine housing 10 that is remote from the tool holder 2. A working axis 7 running parallel to the striking direction 5 and centrally through the tool holder 2 preferably runs through the handle 9 when the latter has to be grasped by one hand. The handle 9 can be partially decoupled from the machine housing 10 by damping elements in order to damp vibrations of the striking mechanism 4.

The user can put the portable power tool 1 into operation by means of a switch 12. Actuation of the switch 12 activates the motor 8. The switch 12 is preferably arranged on the handle 9, as a result of which the latter can be actuated by the hand grasping the handle 9.

The striking mechanism 4 has an exciter piston 13, a striker 14 and an anvil 15. The exciter piston 13, the striker 14 and the anvil 15 are arranged lying on the working axis 7 following one another in the striking direction 5. The exciter piston 13 is coupled to the motor 8 via a gear train.

The gear train converts the rotational movement of the motor 8 into a periodic forward and back movement of the exciter piston 13 on the working axis 7. An exemplary gear train is based on an eccentric gear 16 and a connecting rod 17. Another design is based on a wobble drive.

The striker 14 is coupled to the movement of the exciter piston 13 by a pneumatic chamber 18, also referred to as an air spring. The pneumatic chamber 18 is closed along the working axis 7 by the exciter piston 13 on the drive side and by the striker 14 on the tool side. For this purpose, the striker 14 is in the form of a piston. In the variant illustrated, the pneumatic chamber 18 is closed in the radial direction by a guide tube 19. The exciter piston 13 and the striker 14 slide in an air-tight manner lying against the inner surface of the guide tube 19. In another refinement, the exciter piston can be designed in the form of a cup. The striker slides within the exciter piston. The striker can analogously be designed in the form of a cup, with the exciter piston sliding within the striker. The striker 14, coupled via the pneumatic chamber 18, periodically moves parallel to the striking direction 5 between a drive-side reversing point and a tool-side reversing point. The tool-side reversing point is predetermined by the anvil 15 against which the striker 14 strikes in the tool-side reversing point.

The anvil 15 is guided movably parallel to the striking direction 5 between a stop 20 and the tool 3. During operation, when the tool 3 is pressed against an underlying surface, the user pushes the tool 3 against the anvil 15 and indirectly pushes the anvil 15 against the stop 20. The position of the anvil 15 lying against the stop 20 is referred to as the working position. The striker 14 strikes against the anvil 15 preferably when the anvil 15 is in the working position. The anvil 15 serves to pass the blow of the striker 14 onto the tool 3. Damping of the impact by the anvil 15 is not desirable.

Figure 2:
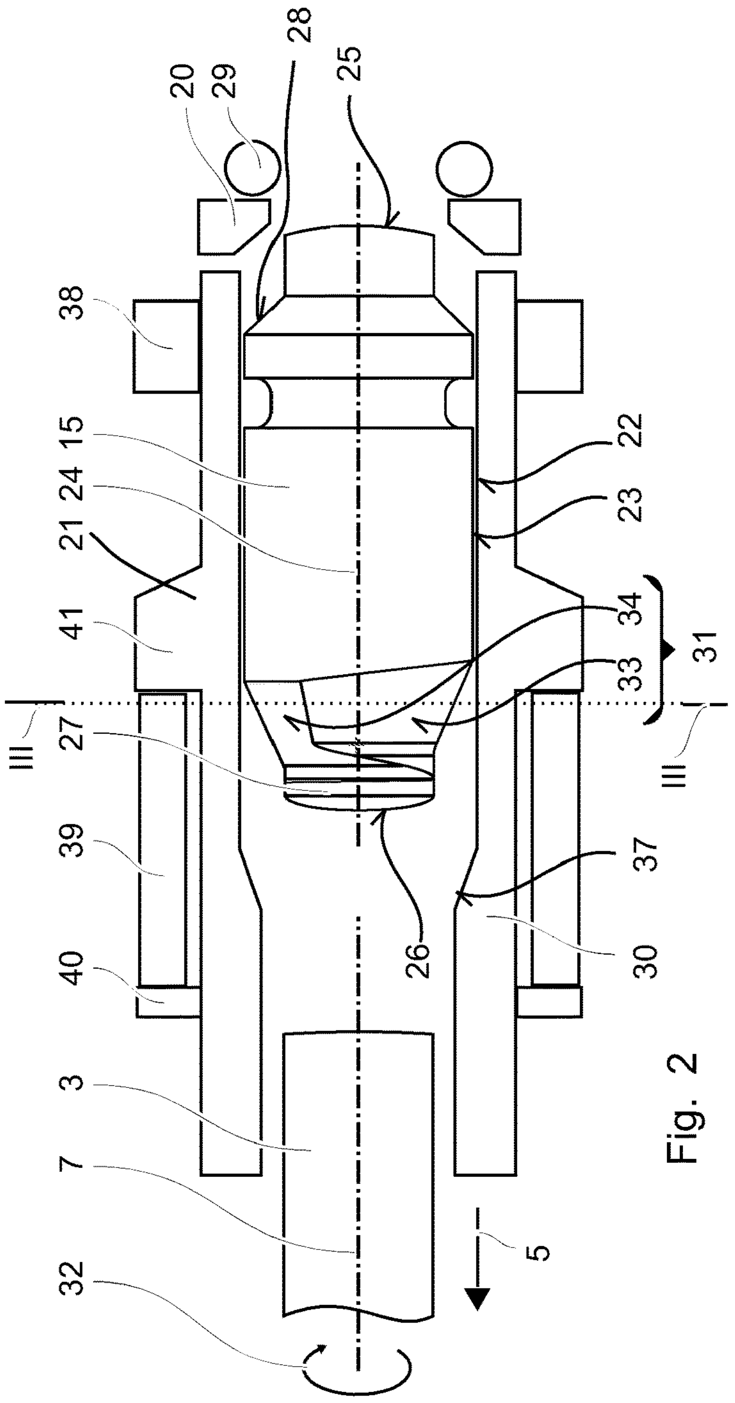
FIG. 2 shows an anvil of the hammer drill
Figure 3:
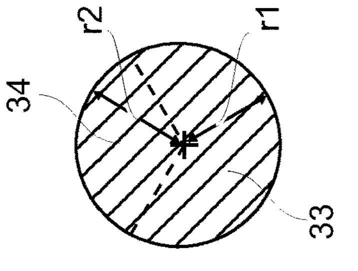
FIG. 3 shows a section plane III-III through the anvil

FIG. 2 shows an exemplary embodiment of the anvil 15. The anvil 15 slides in a tubular guide 21 on the working axis 7. The working axis 7 is determined by the cylindrical inner surface 22 of the guide 21. The inner surface 22 is arranged coaxially with the working axis 7. The anvil 15 has a cylindrical lateral surface 23, which rests against the inner surface 22. The lateral surface 23 typically defines the largest diameter of the anvil 15. Moreover, the lateral surface 23 defines a longitudinal axis or anvil axis 24 of the anvil 15. The anvil axis 24 corresponds to the axis of symmetry of the lateral surface 23. By virtue of the guide 21 of the anvil 15 over the guiding lateral surface 23, the anvil axis lies 24 on the working axis 7.

The anvil 15 has a striking surface 25, which faces in the direction of the striker 14. The striker 14 strikes the striking surface 25. The surface area of the striking surface 25 is typically less than the surface area of a cross section in the region of the guiding lateral surface 23. The striking surface 25 is preferably rotationally symmetrical with respect to the anvil axis 24. Thus, the striker 14 strikes centrally on the striking surface 25, thereby ensuring more efficient energy transfer. The striking surface 25 can be of a flat design, although a convex configuration is preferred. In the embodiment illustrated, the striking surface 25 is adjoined by a cylindrical section, the diameter of which corresponds to the diameter of the striking surface 25.

The anvil 15 has an impact surface 26, which faces in the direction of the tool 3, i.e. in the striking direction 5 and faces away from the striker 14. The anvil 15 rests by means of the impact surface 26 against the tool 3 or strikes by means of the impact surface 26 on the tool 3. The surface area of the impact surface 26 is typically less than the surface area of a cross section in the region of the guiding lateral surface 23. The striking surface 25 is rotationally symmetrical with respect to the anvil axis 24. Impact transfer from the anvil 15 to the tool 3 is performed centrally by the impact surface 26. The impact surface 26 can be flat or convex. In the embodiment illustrated, the impact surface 26 is adjoined by a cylindrical section 27, the diameter of which corresponds to the diameter of the impact surface 26.

In the working position, the anvil 15 rests against the stop 20. The stop 20 can be designed as a ring, for example. The ring has an inside diameter which is somewhat larger than the diameter of the striking surface 25. The anvil 15 has a (recoil impact) surface 28. The recoil impact surface 28 preferably has a conical shape. In the region of the recoil impact surface 28, the diameter of the anvil 15 increases uniformly along the anvil axis 24 from the smaller diameter of the striking surface 25 to the diameter of the guiding lateral surface 23. The recoil impact surface 28 is rotationally symmetrical with respect to the anvil axis 24. A slope of the recoil impact surface 28 relative to the anvil axis 24 and hence also relative to the working axis 7 is preferably constant along the anvil axis 24. The stop 20 can have a likewise conical surface facing the recoil impact surface 28. The stop 20 can be supported in the machine housing 10 via a damper element 29, e.g. a flexible O-ring.

In the chiseling mode, the anvil 15 moves only slightly out of its working position. After a strike by the striker 14 on the anvil 15, the anvil 15 moves no further than the tool 3 out of the tool holder 2. Owing to the contact pressure of the user, the tool 3 is pushed back into the tool receptacle until the anvil 15 is resting against the stop 20.

If a tool 3 is missing or if the tool 3 is not pressed into contact, the anvil 15 moves significantly out of the working position. An (idle strike) catcher 30 stops the anvil 15 in the striking direction 5. The anvil 15 strikes by means of an end face 31 on the catcher 30. The anvil 15 is then situated in its forwardmost position in the striking direction 5. The anvil 15 is tilted somewhat relative to the guide 21 when the anvil 15 strikes against the idle strike catcher 30, i.e. the anvil axis 24 is tilted relative to the working axis 7. The tilting causes jamming of the anvil 15 in the guide 21, thereby dissipating kinetic energy of the anvil 15, and the anvil 15 preferably comes to a halt. The tilting is achieved by a special asymmetry of the end face 31 of the anvil 15.

The end face 31 faces in the striking direction 5 and slopes relative to the anvil axis 24. The end face 31 connects the lateral surface 23 to the impact surface 26. In the region of the end face 31, the diameter of the anvil 15 decreases from the maximum diameter of the guiding lateral surface 23 to the diameter of the impact surface 26. The special feature of the end face 31 is its subdivision in the circumferential direction 32 into a first segment 33 and a second segment 34. In the exemplary embodiment, both segments 33, 34 can be conical. The first segment 33 is offset in the striking direction 5 relative to the second segment 34. The two segments 33, 34 slope relative to the anvil axis 24 and the working axis 7, preferably at a same slope. The offset is evident from the fact that, for a cut-out of the end face 31 at a constant radial distance from the working axis 7, the portion of the cut-out belonging to the first segment 33 is closer to the impact surface 26 than the portion of the cut-out belonging to the second segment 34. The first segment 33 thus makes contact first in the striking direction 5. In one exemplary embodiment, a portion of the first segment 33 lies in the region of 200 degrees to 270 degrees.

The second segment 34 is preferably conical. An axis of the complete cone which forms the second segment 34 preferably coincides with the anvil axis 24. The first segment 33 can likewise be of conical design. A corresponding axis does not coincide with the anvil axis 24. The axis can be offset in parallel with or tilted relative to the anvil axis 24. In each cross section perpendicular to the working axis 7, a radius of curvature r1 of the first segment 33 is greater than the radius of curvature r2 of the second segment. The shallower first segment 33 can take up a larger proportion of the circumference than the steeper second segment 34.

The idle strike catcher 30 is formed by a conical narrowing of the guide 21, for example. The narrowing has an inside diameter which is greater than the diameter of the impact surface 26 of the anvil 15 but less than the diameter of the lateral surface 23 of the anvil 15. The narrowing has a conical inner surface 37, which faces in the direction of the anvil 15. The conical inner surface 37 is preferably rotationally symmetrical with respect to the working axis 7.

The front, first segment 34 results in a larger radial force component as compared with the shallow segment 33. The anvil 15 is tilted or bent as a result. Both effects lead to efficient braking of the anvil 15. This also occurs if the guide 21 of the anvil 15 already has a relatively large clearance parallel to the working axis 7 owing to wear.

The guide 21 can be rigidly anchored in the machine housing 10. The exemplary guide 21 is suspended in a damped manner in the striking direction 5. The guide 21 can be located in a sliding bearing 38, for example. A damping element 39, e.g. an elastomer, is clamped between a stop 40 fixed in relation to the housing, and a projection 41. The stop 40 is arranged ahead of the projection 41 in the striking direction 5.

In one embodiment, the first segment 33 can be formed by a flat or almost flat bevel. A radius of curvature r1 of the first segment 33 is accordingly very large. In this embodiment, the first segment 33 makes up a smaller proportion of the circumference, e.g. between 30 degrees and 45 degrees.

The invention claimed is:

1. A portable power chiseling tool comprising:

a tool holder for holding a tool on a working axis;

a striking mechanism having an exciter piston, a striker, a pneumatic chamber closed by the exciter piston and the striker for coupling a movement of the striker to the exciter piston, and an anvil arranged in a striking direction downstream of the striker for transmitting a blow of the striker to the tool;

a guide for the anvil for guiding the anvil on the working axis;

an idle strike catcher for the anvil, the catcher having a conical inner surface facing the anvil, the anvil having an end face facing in the striking direction sloping relative to the working axis and resting against the conical inner surface when the anvil is in a forward-most position in the striking direction, the end face of the anvil having a first segment and a second segment in a circumferential direction, wherein the second segment is offset in the striking direction relative to the first segment.

2. The portable power chiseling tool as recited in claim 1 wherein, in a section perpendicular to the working axis, the first segment has a first radius of curvature and the second segment has a second radius of curvature, and the first radius of curvature is greater than the second radius of curvature.

3. The portable power chiseling tool as recited in claim 1 wherein the first segment is described by a first cone, a first cone axis of the first cone being offset relative to the working axis.

4. The portable power chiseling tool as recited in claim 3 wherein the second segment is described by a second cone, a second cone axis of the second cone being coaxial with the working axis.

5. The portable power chiseling tool as recited in claim 4 wherein the first cone is offset relative to the second cone along the working axis.

6. The portable power chiseling tool as recited in claim 1 wherein a slope of the first segment relative to the working axis is the same as a slope of the second segment relative to the working axis.

7. The portable power chiseling tool as recited in claim 1 wherein the first and second segments share a same radial extent at different circumferential locations.

8. The portable power chiseling tool as recited in claim 1 wherein the first segment strikes the conical inner surface before the second segment so that an anvil axis tilts relative to the guide.

9. The portable power chiseling tool as recited in claim 1 wherein the end face has an asymmetry due having the first segment and the second segment in the circumferential direction.

10. The portable power chiseling tool as recited in claim 1 wherein the first segment occupies between 30 and 35 degrees of the circumference.

11. The portable power chiseling tool as recited in claim 1 wherein the first segment takes up a larger proportion of the circumference than the second segment.

* * * * *